W. C. BUCKNAM.
PRESSURE REGULATOR.
APPLICATION FILED DEC. 5, 1919.
1,427,191.
Patented Aug. 29, 1922.
2 SHEETS—SHEET 1.
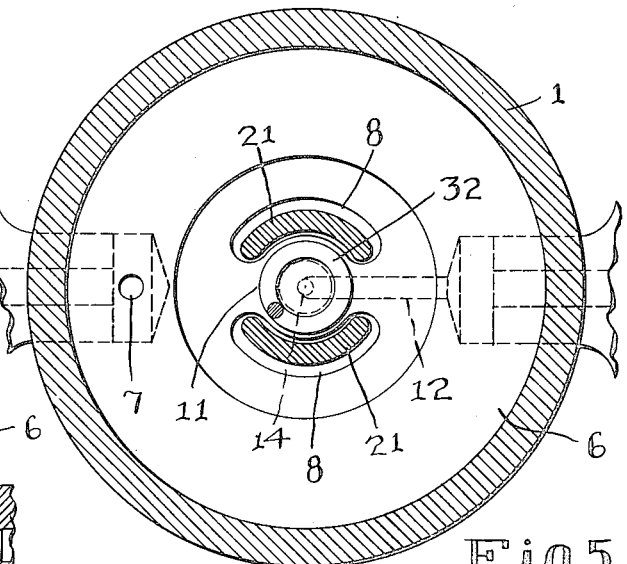
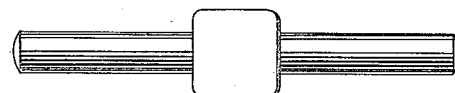
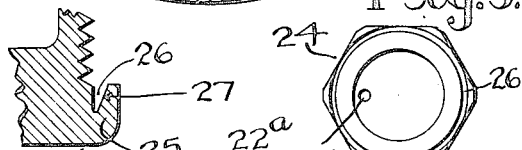
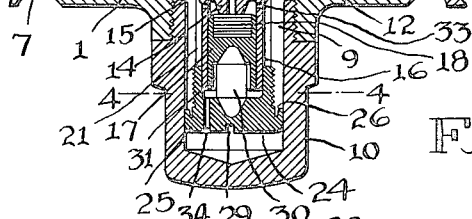
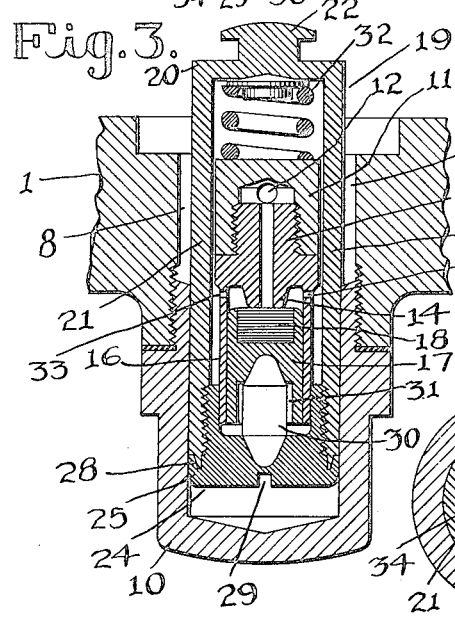
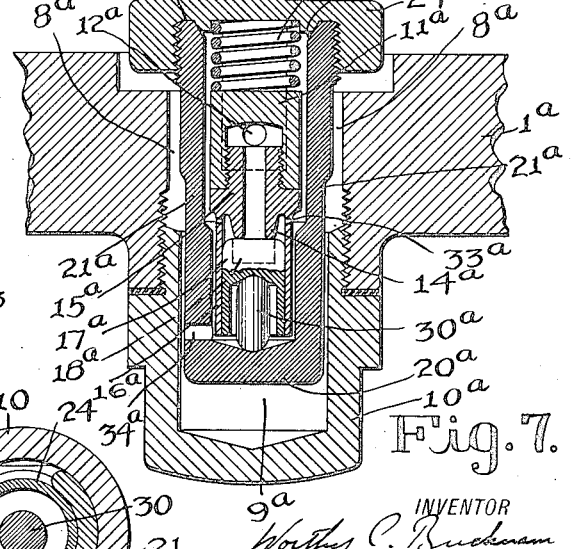
INVENTOR
Worthy C. Bucknam
BY
ATTORNEY

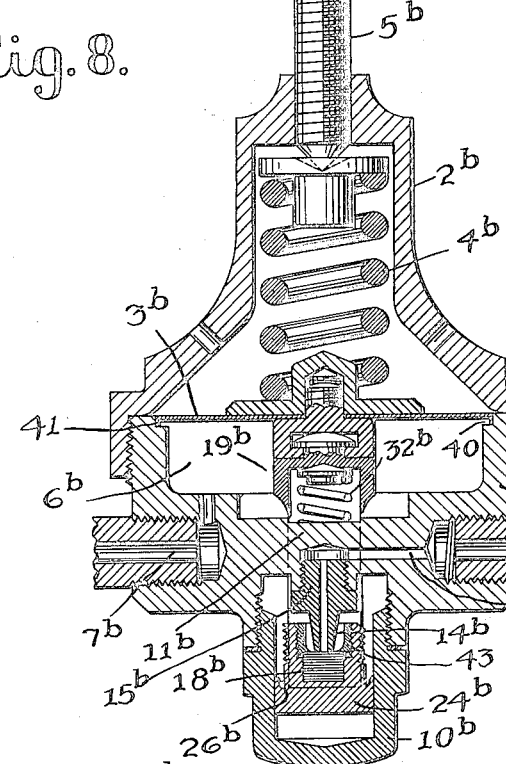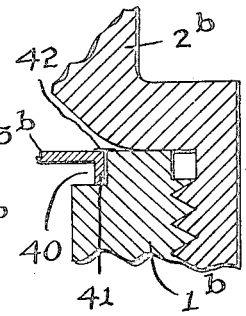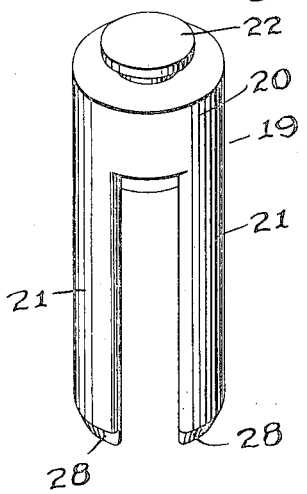

UNITED STATES PATENT OFFICE.

WORTHY C. BUCKNAM, OF JERSEY CITY, NEW JERSEY, ASSIGNOR, BY MESNE ASSIGNMENTS, TO AIR REDUCTION COMPANY, INCORPORATED, OF NEW YORK, N. Y., A CORPORATION OF NEW YORK.

PRESSURE REGULATOR.

1,427,191.      Specification of Letters Patent.      Patented Aug. 29, 1922.

Application filed December 5, 1919. Serial No. 342,633.

*To all whom it may concern:*

Be it known that I, WORTHY C. BUCKNAM, a citizen of the United States, and resident of Jersey City, in the county of Hudson and State of New Jersey, have invented a new and useful Pressure Regulator, of which the following is a specification.

The invention relates to pressure-regulators or reducing valves. The object is to provide a simple, compact, readily-manufactured, long-wearing, easy-working, sensitive and dependable regulator. A particular object is to insure rigidity of the high pressure nozzle, which is important for accurate seating. To this end the invention may be said to comprise the novel construction and combinations of parts hereinafter more particularly described with reference to certain preferred illustrative embodiments.

In the accompanying drawings, forming a part hereof:

Fig. 1 is an axial section;

Fig. 2 is an enlarged transverse section taken through the diaphragm chamber;

Fig. 3 is an enlarged fragmentary section taken at right angles to Fig. 1;

Fig. 4 is a transverse section on the line 4—4 of Fig. 1;

Fig. 5 is a plan view of a nut;

Fig. 6 is an enlarged fragmentary section of the same;

Fig. 7 is a view like Fig. 3 showing a modification;

Fig. 8 is an axial section through still another form;

Fig. 9 is an enlarged fragmentary axial section at right angles to Fig. 8;

Fig. 10 is an enlarged fragmentary section illustrating the manner of securing the metal diaphragm of this form; and Fig. 11 is a perspective view of the body of the stirrup.

The regulator has a circular body 1, a bonnet 2 screwed thereon, a diaphragm 3, resilient or not, clamped at the edges between the body and bonnet, a spring 4 in the bonnet pressing upon the diaphragm, and a regulating screw 5 passing through the top of the bonnet and acting upon the spring, as is familiar in gas pressure-regulators.

Beneath the diaphragm the body is formed with a large diaphragm chamber 6, from which there is an outlet 7. In the floor of the diaphragm chamber are two curved slots 8, at opposite sides of the center, communicating with a small circular antechamber 9 below the floor and coaxial with the diaphragm chamber. The antechamber is largely formed in and rendered accessible by a cup 10 screwed into the body. The portion 11 of the floor of the diaphragm chamber between the slots 8 constitutes a rigid bridge, integrally joined at both ends with the body of the regulator.

A transverse inlet passage 12 is formed in the body extending inward from one side, through one-half of the bridge 11, to the center, where it delivers through a nozzle 14, carried by the middle of the bridge and projecting into the antechamber and away from the diaphragm chamber. Said nozzle is formed on a separate plug 15 screwed from below into the center of the bridge, by which it is held in rigid alinement.

In the preferred construction the nozzle plug has integral with it a tubular guide 16, which projects from around the nozzle downward within the antechamber. The rim of the fixed nozzle 14 cooperates with a movable valve-seat member 17, consisting of a cylindrical body guided in said tube, with a flat insert or seat 18 held in its top, and having its lower part hollow.

Said valve-seat member is in separate thrust relation to a stirrup 19, which extends from the diaphragm chamber, where it has operative connection with the diaphragm to the antechamber, where it is guided. The body of the stirrup has an integral closed head end portion 20 and its remainder is cross-slotted all the way to the lower end, forming two limbs 21, of curved cross-section, passing loosely through the slots 8. The head 20 is provided with a button 22 which is slipped laterally into an undercut socket in a fitting 23 on the center of the diaphragm, a form of connection which is well known.

The lower ends of the limbs are screw-threaded upon the inside to receive a detachable end member of the stirrup, formed by a hollow plug 24 having a cylindrical screw-threaded exterior to screw into the ends of the limbs, and a peripheral flange or head 25. This flange is formed with a circular grooved seat 26 on its side which abuts the ends of the limbs, said groove having its outer wall 27 beveled to cooperate with external bevels 28 on the extremities of the limbs, forming means to wedge and lock the limbs against the screw-threads of the plug (Figs. 6 and 11) to prevent their springing away and losing the plug under the heavy pressure, as they would otherwise be likely to do. The plug has a closed bottom end and is provided with a kerf 29, by means of which it can be screwed in and out. The lower portion of the stirrup is guided in the annular guideway formed between the outside of the alining tube 16 and the inside of the encircling wall of the cap 10 of the antechamber, both of which are finished smooth and true to cooperate with slide bearing surfaces formed on the inside of the plug and the outside of the limbs respectively. The sliding fit can be fairly close, or comparatively loose as indicated in the somewhat different construction shown in Fig. 7. The flange 25 may be slabbed or hexed to prevent any possibility of compression or rarefication between the plug and the end wall of this cap.

The stirrup and the valve-member are thus independently guided; and an equalizing thrust connection is provided between them, in the form of a short stout pin 30 with rounded or conical ends bearing in sockets in the bottom wall of the plug 24 and in the top of the recess 31 in the lower part of the valve-seat member. This connection accommodates any slight inequalities of manufacture, and permits of slight lateral play in the guiding of the stirrup without causing lateral pressure or sticking of the valve member in its guide or failure to seat squarely on the nozzle.

A short compression spring 32, relatively much lighter than the main spring 4, is interposed between the head of the stirrup and the top of the bridge 11. This spring tends to lift the stirrup, and if the regulating screw 5 is unscrewed all the way so as to take the pressure off the spring 4, at a time when the outlet from the diaphragm chamber to the atmosphere is wide open, will hold the valve closed against the pressure of the gas at the nozzle 14. With this spring it is not absolutely necessary that the stirrup be tied to the diaphragm.

The gas after escaping between the nozzle 14 and the valve-seat member passes outward through holes 33 in the base of the guide 16, and thence upward into the diaphragm chamber. A vent 34 may be provided through the bottom of the plug 24 to avoid possible vacuum or compression effect between it and the valve-seat member.

Fig. 7 shows a modified construction in which the bifurcated stirrup is inverted, with its integral end portion $20^a$ at the bottom and a detachable end member $24^a$ at the top. In assembling, the limbs $21^a$ of this stirrup are inserted upward from the antechamber $9^a$ through the slots $8^a$, instead of downward from the diaphragm chamber, as in the case of the limbs 21 of the stirrup of Figs. 1 to 6. The end member $24^a$ is in the form of a cap having a depending flange internally screw-threaded to engage external interrupted screw-threads on the upper end portions of the limbs $21^a$. The inner corners of these limbs have bevels $28^a$, which cooperate with the inner beveled wall of a circular grooved seat $26^a$ in the under part of the top of the cap next the screw-threads, the function being the same as in the case of the similar formations described in connection with the other form of the invention. The diaphragm-connection button $22^a$ is formed on the cap $24^a$. The other parts of this construction will be readily understood in connection with the preceding form, corresponding parts being designated by the same numerals of reference with super-character $a$. The form of Figs. 1 to 6 possesses the special advantage of rendering the valve-seat chamber 17 and the nozzle 14 readily accessible, without taking the regulator apart, by successively unscrewing the cap 10 and the plug 24, when the valve-seat member comes out in the hand and the nozzle is left exposed, surrounded only by its tube 16. It also enables the regulator to be readily assembled in case a metal diaphragm is employed, which is soldered in place, instead of being merely clamped between the body and bonnet, as in the case of a rubber diaphragm such as shown in Fig. 1.

Figs. 8 to 10 illustrate a form of the regulator having a metal diaphragm $3^b$. This diaphragm is secured to the body $1^b$ by soldering after a novel manner. The top of the circular wall of the diaphragm chamber $6^b$ is formed with an internal rabbet or annular seat 40, and the outer edge of the diaphragm disk is turned at right angles to form a flange 41 at the lower or under side, which fits into the rabbet. Solder 42 is then run into the crevice between the flange and the wall of the rabbet; and in this way the diaphragm is firmly and tightly held against the internal pressure.

These views also illustrate a simplified construction whereby the movable valve seat $18^b$ is carried by the stirrup $19^b$, the body of which is like the stirrup of Figs. 1 to 4 and 11. The nozzle $14^b$ carried by the center of the bridge $11^b$ is without the guide tube of the other forms. The valve seat $18^b$ is held in a pocket in the interior of the plug $24^b$, by a screw bushing 43. Other features are similar to those already described, and are designated by the same reference numerals with super-character $b$.

What I claim as new is:

1. A pressure-regulator having a body, a diaphragm, an inlet nozzle projecting away from the diaphragm, and a movable seat cooperative with the nozzle, a bridge in the body on the middle of which the nozzle is supported, and a stirrup comprising a bifurcated body having interrupted screw-threads on the ends of its limbs, a detachable end member having screw-threads to engage said interrupted threads, and means to lock the ends of the limbs against springing away from the screw-threads on the end member.

2. A pressure-regulator having a body, a diaphragm, an inlet nozzle projecting away from the diaphragm, and a movable seat cooperative with the nozzle, a bridge in the body on the middle of which the nozzle is supported, and a stirrup comprising a bifurcated body having interrupted screw-threads on the ends of its limbs, a detachable end member having screw-threads to engage said interrupted threads, and an annular channel in the end member the wall of which has wedging engagement with the ends of the limbs to hold the same against the screw-threads of the member.

3. In a pressure regulator having a diaphragm, an inlet nozzle opening away from the diaphragm, and a movable seat cooperative with the nozzle: a stirrup forming an operative connection between the diaphragm and seat, said stirrup comprising a bifurcated body having interrupted screw-threads on the ends of its limbs, a detachable end member having screw-threads to engage said interrupted threads, and means for locking the ends of the limbs in engagement with the end member.

4. In a pressure-regulator having a diaphragm, an inlet nozzle opening away from the diaphragm, and a movable seat cooperative with the nozzle: a stirrup forming an operative connection between the diaphragm and seat, said stirrup comprising a bifurcated body having interrupted screw-threads on the ends of its limbs, a detachable end member having screw-threads to engage said interrupted threads, and an annular surface on the end member having wedging action upon the ends of the limbs against the screw-threads.

5. A pressure-regulator having a diaphragm, a case containing a diaphragm chamber and a coaxial antechamber in communication with each other, a fixed axial inlet nozzle delivering into the antechamber and away from the diaphragm chamber, and a fixed tubular guide projecting from around said inlet into the antechamber, a movable stirrup having operative connection with the diaphragm extending from the diaphragm chamber into the antechamber, said stirrup embracing the tube and being guided thereby, a valve-seat member within the tube in said guide loose from the stirrup, and a thrust member between the bottom of the stirrup and the valve-seat member.

6. A pressure-regulator having a diaphragm, a case containing a diaphragm chamber and a coaxial antechamber in communication with each other, a fixed axial inlet nozzle delivering into the antechamber and away from the diaphragm chamber, and a fixed tubular guide projecting from around said inlet into the antechamber, a movable stirrup having operative connection with the diaphragm extending from the diaphragm chamber into the antechamber, the antechamber being formed with an annular guideway between its wall and said guide and the lower part of the stirrup being formed to be slidably guided therein outside of the tube, a valve-seat member slidable inside said guide in separate thrust relation to the stirrup, and a thrust member between the bottom of the stirrup and the valve-seat member.

7. A pressure-regulator having a diaphragm, a case containing a diaphragm chamber and a coaxial antechamber in communication with each other, a fixed axial inlet nozzle delivering into the antechamber and away from the diaphragm chamber, and a fixed tubular guide projecting from around said inlet into the antechamber, a movable stirrup having operative connection with the diaphragm extending from the diaphragm chamber into the antechamber, a valve-seat member cooperating with said nozzle, and a thrust member between the bottom of the stirrup and said valve member, the valve member being slidably guided on the inside of said tubular guide and the lower part of the stirrup being guided on the outside thereof.

WORTHY C. BUCKNAM.